United States Patent [19]

Vanderheiden

[11] 4,367,207

[45] Jan. 4, 1983

[54] PROCESS FOR THE PREPARATION OF FINELY DIVIDED PRECIPITATED CALCIUM CARBONATE

[75] Inventor: Dennis B. Vanderheiden, Easton, Pa.

[73] Assignee: Pfizer Inc., New York, N.Y.

[21] Appl. No.: 217,735

[22] Filed: Dec. 18, 1980

[51] Int. Cl.³ .......................... C01F 5/24; C01F 11/28
[52] U.S. Cl. ..................................... 423/432; 423/266
[58] Field of Search ............... 423/430, 432, 165, 169, 423/266

[56] References Cited

U.S. PATENT DOCUMENTS

| | | | |
|---|---|---|---|
| 1,654,099 | 12/1927 | Shiriashi | 423/432 |
| 2,058,503 | 10/1936 | Rafton et al. | 423/432 |
| 3,126,253 | 3/1964 | Podschus | 423/432 |
| 4,157,379 | 6/1979 | Arika et al. | 423/432 |

FOREIGN PATENT DOCUMENTS

| | | | |
|---|---|---|---|
| 2742829 | 3/1978 | Fed. Rep. of Germany | 423/432 |
| 492552 | 9/1938 | United Kingdom | 423/432 |
| 1222471 | 2/1971 | United Kingdom | 423/432 |

OTHER PUBLICATIONS

Juvekar et al., Absorption of $CO_2$ in a Suspension of Lime Chemical Engr. Science 1973 vol. 28 pp. 825–837.
Attarian et al., pH Control of a Continuous Precipitator, Canadian Journal of Chemical Engineering vol. 54 Dec. 1976, pp. 606–611.
Chapnerkar, Nucleation and Crystal Growth Phenomenon in Making Precipitated Calcium Carbonates, Paper Presented at Aiche 69 National Meeting, May 17–19, 1969.
Buehrer et al., The Inhibiting Action of Minute Amounts of Sodium Hexametaphosphate on the Precipitation of Calcium Carbonates from Ammonical Solutions, J. Phys. Chem., vol. 44, 1940, pp. 552–575.
Reddy et al., *Prepared Papers, National Meeting, Div. Water, Air and Waste Chem.,* Amer. Chem. Soc., 12, No. 2, 212–216, Aug. 1972.
Reddy et al., *Desalination,* 12, 61–73, 1973.

*Primary Examiner*—Gary P. Straub
*Attorney, Agent, or Firm*—Charles J. Knuth; Peter C. Richardson; Harold W. Ordway

[57] ABSTRACT

A process for the preparation of finely divided precipitated calcite in which carbon dioxide is introduced into an aqueous calcium hydroxide slurry containing anionic organopolyphosphonate polyelectrolyte with the carbonation started at a temperature above about 7° and below about 18° C.

8 Claims, No Drawings

PROCESS FOR THE PREPARATION OF FINELY DIVIDED PRECIPITATED CALCIUM CARBONATE

BACKGROUND OF THE INVENTION

This invention concerns precipitated calcium carbonate. More specifically, it concerns a novel method for precipitating a calcite of minute particle size and high purity by the carbonation of an aqueous lime slurry in the presence of certain organophosphorous compounds.

Precipitated calcium carbonate is commonly prepared by the carbonation of aqueous lime slurries, and numerous agents, such as those disclosed in U.S. Pat. Nos. 2,188,663, 2,242,228, 2,467,082, 3,003,010, 3,126,253, 3,133,824, 3,347,624, 3,443,890 and 4,018,877, Japanese Patent Publication No. 71-7373 and Patent Disclosures Nos. 48-103100 and 53-53598, and USSR Pat. No. 323365, have been proposed to control the particle size of the precipitate. Such agents, however, have apparently failed to produce a calcite of high purity having a particle size in the order of 0.01 micron. It is therefore a primary objective of the present invention to develop an economic process for the preparation of a precipitated calcite of such purity and particle size by the carbonation of aqueous lime slurry.

Carbonation of lime slurries at starting temperatures below 20° C. is disclosed in such references as U.S. Pat. Nos. 1,654,099, 2,141,458, 2,188,663, 2,631,922, 3,126,253, 3,133,824, 3,320,026 and 4,133,894 and in Japanese Patent Disclosure No. 48-103100, but, again, such preparations have apparently failed to produce the presently sought calcite.

Use of polyphosphonates as detergent builders or as dispersants in systems containing calcium carbonate is disclosed in U.S. Pat. Nos. 3,925,228 and 4,049,586 and in Belgium Pat. No. 855,456. The influence of these phosphonates on the nucleation rate and crystal growth of calcium carbonate from supersaturated solutions is disclosed by Reddy and Nancollas in "The Effect of Phosphate and Phosphonates on Nucleation and Crystal Growth of Calcium Carbonate," *Prepared Papers, National Meeting, Dir. Water, Air and Waste Chem., Amer. Chem. Soc.*, 12, No. 2, 212-16, August, 1972 and in "Calcite Cyrstal Growth Inhibition by Phosphonates," *Desalination*, 12, 61-73, 1973; use of the phosphonates for the production of precipitated calcium carbonate by carbonation of lime slurry is not, however, contemplated by these publications.

SUMMARY OF THE INVENTION

I have now found that precipitation of calcium carbonate by the carbonation of aqueous lime slurries containing polyphosphonate at starting temperatures greater than about 7° C. and less than about 18° C. consistently produces the desired high purity calcite having a particle size of about 0.01 to 0.03 micron.

Accordingly, the present invention entails a process for the preparation of finely divided precipitated calcite which comprises introducing carbon dioxide into an aqueous slurry of greater than about 5 weight percent calcium hydroxide containing anionic organopolyphosphonate polyelectrolyte, preferably in the amount of from about 0.05 to 0.5 weight percent based on the calcium carbonate equivalent of the hydroxide, starting the introduction at a temperature above about 7° C. and below about 18° C. and continuing the introduction until calcite precipitation is substantially complete. Preferably, the polyelectrolyte is hexamethylenediaminetetra (methylenephosphonic acid); the starting temperature is from about 10° to 15° C. with the temperature maintained below about 30° C. during the course of the introduction; the concentration of the hydroxide in the slurry is from about 10 to 15 weight percent; and the introduction is terminated when the carbonated slurry is at a pH of about 7, after which the slurry is treated with sufficient polybasic acid to essentially neutralize any unreacted calcium hydroxide present.

DETAILED DESCRIPTION OF THE INVENTION

The process of the present invention, by carbonating aqueous lime slurries in the presence of an anionic organopolyphosphonate polyelectrolyte and at a starting temperature above about 7° C. and below about 18° C., provides a simple and economic means of obtaining a minute calcite product of very high purity. The product of the process has a particle size of about 0.01 to 0.03 micron as measured by electron microscopy analysis and, with proper selection of reactants, a calcium carbonate content of greater than 98 percent, the only impurities normally being the added polyelectrolyte, magnesium carbonate and/or hydroxide from the starting lime, and intercrystalline water.

The anionic polyelectrolytes employed in the instant process are organopolyphosphonates of varying molecular weight commonly used as scale inhibitors, sequestrants, deflocculants and detergent promoters. Such organopolyphosphonates include, for example, nitrilo tris (methylene phosphonic acid), ethylenediaminetetra (methylene phosphonic acid), diethylenetriaminepenta (methylene phosphonic acid), hydroxy ethane-1,1-diphosphonic acid, ethanolamine, N,N-dimethylene phosphonic acid and hexamethylenediaminetetra (methylene phosphonic acid) as well as their alkali metal and ammonium salts. The preferred polyelectrolyte is hexamethylenediaminetetra (methylene phosphonic acid).

In employing the anionic polyelectrolyte of the instant invention, the polyelectrolyte is added to the calcium hydroxide, or slaked lime, slurry prior to carbonation of the slurry. The polyelectrolyte is added in extremely small amounts, levels as low as about 0.02 weight percent, based on the calcium carbonate equivalent of the lime content of the slurry, being effective. Such an amount is in sharp contrast to the levels normally used in prior art calcium carbonate precipitations employing agents to control the particle size of the precipitate. Since the size-controlling agent tends to be incorporated into the precipitating calcium carbonate, the use of such low levels in the present process results in a final product of high purity. Higher levels of the polyelectrolyte, of course, can be used, but with an amount greater than about 1.0 percent of the calcium carbonate equivalent of the lime, the addition becomes expensive and the product purity is sacrificed. The preferred addition level is from about 0.05 to 0.5 weight percent of the calcium carbonate equivalent of the lime.

The desired product from the present process is obtained only when the temperature for the carbonation of the lime slurry is carefully controlled. To consistently produce the desired particle size, the starting temperature of the carbonation should be above about 7° C. and below about 18° C. By starting temperature is meant the temperature of the lime slurry at the start of and during the nucleation period, or for the first about 15 percent of the entire carbonation as explained hereinafter. If the starting temperature of the carbonation is outside the specified range, the particle size of the product may be considerably larger than the desired 0.01 to 0.03 micron. The preferred starting temperature for producing particles of the desired size is from about 10° to 15° C. While the starting temperature of the carbonation is critical in producing a precipitated calcium carbonate of the desired particle size, the temperature during the remainder of the carbonation also tends to influence the size of the resulting precipitate. For this reason, the temperature of the slurry is preferably maintained below about 30° C. throughout the carbonation.

The physicochemical processes involved in nucleation are not well understood. In its present usage, however, the nucleation period is defined as the initial portion of the carbonation, about 15 percent of the total reaction time, in which the saturated calcium hydroxide solution of the lime slurry becomes supersaturated with respect to calcium carbonate by the introduction of the carbon dioxide gas. During this period, it is believed that calcium and carbonate ions join in solution to form innumerable collections of partially organized subcritical nuclei. With time and continued carbonation, these loose collections of ions coalesce, become more ordered in structure and increase the critical size where their probability of growth exceeds that of redissolution at the given level of supersaturation. The nucleation period is completed when sufficient critical nuclei exist such that the probability of critical nuclei growth exceeds the probability of new, subcritical nuclei formation.

The nature of the carbon dioxide gas for the carbonation is not particularly critical, the standard mixtures of carbon dioxide in either nitrogen or air commonly used for such carbonations being satisfactory. Likewise, the nature of the source for the starting calcium hydroxide slurry is not critical; either lime or hydrated lime (calcium hydroxide) may be used. The purity of the carbonating gas and the lime essentially determine the purity of the final product.

While the present process is applicable to all concentrations of lime slurries which can be carbonated, it is practically limited to those slurries in which the calcium hydroxide concentration of the starting slurry is greater than about 5 weight percent. This is because precipitated calcite of the desired particle size can be realized under the present carbonation conditions with slurries having an initial calcium hydroxide concentration of about 5 percent or less even in the absence of the anionic organopolyphosphonate polyelectrolyte. Such low concentrations, however, are uneconomic. For most economical operation, the concentration of the calcium hydroxide in the slurry to be carbonated is preferably from about 10 to 15 percent by weight.

The carbonation of the lime slurry is continued until calcite precipitation is substantially complete, preferably being terminated when the pH of the carbonated slurry is at about 7. Such carbonation is usually accomplished in a period of about one hour or less. Normal care is exercised to neutralize any unreacted calcium hydroxide still present in the carbonated slurry. Various techniques known to those skilled in the art can be used to accomplish this neutralization. These include, for example, monitoring the slurry pH with introduction of additional carbon dioxide gas as necessary as well as treating the carbonated slurry with a sufficient amount of an organic or inorganic polybasic acid such as citric, maleic, malic, malonic, phthalic, tartaric, boric, phosphoric, sulfurous or sulfuric acid.

The calcium carbonate in the final slurry may be utilized as such, or may be filtered, dried and milled for use as a dry product.

Provided the reactants are of sufficient purity, the product resulting from the process of the instant invention is sufficiently pure to readily meet the USP specification for precipitated calcium carbonate. The product will typically analyze, when using methods specified by USP, to greater than 98.0 percent calcium carbonate.

The following examples are merely illustrative of the process of the present invention and are not to be construed as limiting the invention, the scope of which is defined by the appended claims.

EXAMPLE 1

The following carbonation was conducted in a 4-liter cylindrical glass reactor having an internal diameter of 13.2 cm and height of 33.3 cm equipped with a high-speed agitator having a 5 cm diameter pitched-blade turbine impellor, a stainless steel carbonation tube of 0.3 cm internal diameter directing the carbon dioxide gas stream to the impellor, and an ice cooling bath.

A 9.5 weight percent aqueous calcium hydroxide, or milk of lime, slurry was prepared by adding over a period of about 90 seconds 223 g of pulverized active lime having an available calcium oxide content of about 93 weight percent (determined by ASTM procedure C-25-72) to a total of 2676 g of tap water contained in the 4-liter carbonator stirred at about 1100 rpm. The resulting slurry, after stirring a total of 10 minutes, was cooled from the final slaking temperature of 74° C. to 15° C. by means of the ice bath.

An amount of hexamethylenediaminetetra (methylene phosphonic acid) potassium salt (2.81 g WAY-PLEX 68-K; 33 weight percent aqueous solution; Philip A. Hunt Chemical Corporation, Lincoln, R.I.) equivalent to 0.25 weight percent of the calcium carbonate equivalent of the calcium hydroxide content of the slurry was added to the slaked lime slurry at 15° C. The agitator was then adjusted to about 2400 rpm and the slurry was carbonated by passing a gas mixture of 28 volume percent carbon dioxide in air at 9.1 liters/min through the slurry over a 37-minute period while maintaining the slurry temperature at 15°±1° C.

The carbonated slurry at pH 7.3 was passed through a 325 mesh screen, to remove the grit present in the original lime, and vacuum filtered on filter cloth. The filter cake was air dried overnight at 120° C. to yield a precipitated calcite having an average particle size of 0.029 micron as determined by electron microscopy analysis.

In this analysis, the average particle size of the product was obtained by direct measurement from transmission electron micrographs (TEM) at 100,000 to 300,000× magnification. About 30 particles in a TEM field were randomly chosen for measurement whose even, symmetrical crystal shape clearly distinguished them as single crystals rather than aggregates of more than one crystal. The diameter of each particle was measured, the measurements of the coarsest 10 percent and the finest 10 percent of the particles were discarded, and the remaining 80 percent were averaged to obtain the average particle size.

EXAMPLE 2

Precipitated calcium carbonate was prepared using the same equipment and slaking procedure of Example 1. An amount of hexamethylenediaminetetra (methylene phosphonic acid) potassium salt (0.556 g WAYPLEX 68-K) equivalent to 0.05 weight percent of the calcium carbonate equivalent of the calcium hydroxide content of the slaked lime slurry was added to the slurry at 15° C. The agitator was then adjusted to about 2400 rpm and the slurry was carbonated by passing a gas mixture of 28 volume percent carbon dioxide in air at 9.1 liters/min through the slurry over a 37-minute period while maintaining the slurry temperature at 15°±1° C.

A known portion of the carbonated slurry at pH 7.3 was treated with 0.104 g of anhydrous citric acid dissolved in water, representing 0.3 weight percent citric acid on the calcium carbonate content of the slurry, then passed through a 325 mesh screen to remove the grit present in the original lime, and vacuum filtered on filter cloth. The filter cake was air dried overnight at 120° C. to yield a precipitated calcite having an average particle size of 0.030 micron as determined by electron microscopy analysis described in Example 1.

EXAMPLE 3

Precipitated calcium carbonate was prepared following the slaking and carbonation procedures of Example 2 using 0.556 g WAYPLEX 68-K (0.05 percent by weight on calcium carbonate basis). The carbonated slurry at a pH of 7.5 was treated with 1.3 g of 85 percent reagent grade phosphoric acid, representing 0.3 weight percent phosphoric acid on the calcium carbonate content of the slurry, then passed through a 325 mesh screen to remove the grit present in the original lime, and vacuum filtered on filter cloth. The filter cake was air dried overnight at 120° C. to yield a precipitated calcite having an average particle size of 0.020 micron as determined by electron microscopy analysis.

EXAMPLE 4

Precipitated calcium carbonate was prepared following the slaking, carbonation and isolation procedures of Example 3 with the exception that the carbonation temperature was held at 15°±1° C. through the nucleation period (first 15 percent) of the carbonation and then allowed to gradually rise to a final temperature of 31° C., the total carbonation period being 35 minutes. The pH of the carbonated slurry prior to phosphoric acid addition was 7.4, and the final dried product was a precipitated calcite with an average particle size of 0.020 micron.

EXAMPLE 5

Precipitated calcium carbonate was prepared following the slaking, carbonation and isolation procedures of Example 3 but varying the concentration of the calcium hydroxide slurry and the level of anionic polyelectrolyte present in the starting slurry as indicated in the following table. In each of the preparations, the anionic polyelectrolyte was hexamethylenediaminetetra (methylene phosphonic acid) potassium salt, the carbonation temperature was held at 15°±1° C. during the entire carbonation, and the carbonated slurry was treated with an amount of phosphoric acid equivalent to 0.3 weight percent of the calcium carbonate content of the slurry prior to the screening, filtering and drying of the product.

| Ex. | Slurry Ca(OH)$_2$, g/100g slurry | Polyelectrolyte, g/100g CaCO$_3$ | Product Calcite. Avg Particle Size, micron |
| --- | --- | --- | --- |
| 5-A | 9.5 | 1.0 | 0.021 |
| 5-B | 15.4 | 0.5 | 0.021 |
| 5-C | 15.4 | 0.3 | 0.021 |
| 5-D | 15.4 | 0.1 | 0.024 |
| 5-E | 15.4 | 0.02 | 0.023 |
| 5-F | 15.4 | 0.01 | 0.26 |
| 5-G | 15.4 | 0.004 | 0.29 |

EXAMPLE 6

Precipitated calcium carbonate was prepared following the slaking, carbonation and isolation procedures of Example 3 but varying the nature of the anionic polyelectrolyte added prior to the carbonation as indicated in the following table. In each preparation, a 9.5 weight percent calcium hydroxide slurry was carbonated, the anionic polyelectrolyte was added prior to the carbonation in the amount of 0.5 weight percent of the calcium carbonate equivalent of the lime content of the slurry, and the temperature of the slurry was maintained at 15°±1° C. throughout the carbonation.

| Ex. | Anionic Polyelectrolyte added[1] | Product Calcite Avg Particle Size, micron |
| --- | --- | --- |
| 6-A | nitrilo tris (methylene phosphonic acid) | 0.022 |
| 6-B | hydroxy ethane-1,1-diphosphonic acid | 0.023 |
| 6-C | diethylenetriaminepenta (methylene phosphonic acid) sodium salt | 0.017 |
| 6-D | ethanolamine N,N—dimethylene phosphonic acid | 0.025 |

[1]additive for
Ex. 6-A WAYPLEX NTP-A, 50 wt. % aqueous solution;
6-B WAYPLEX HEDP-A, 60 wt. % aqueous solution;
6-C WAYPLEX 55-S, 50 wt. % aqueous solution; and
6-D WAYPLEX 61-A, 60 wt. % aqueous solution;
all supplied by Philip A. Hunt Chemical Corporation, Lincoln, Rhode Island

EXAMPLE 7

Precipitated calcium carbonate was prepared by following the slaking, carbonation and isolation procedures of Example 3 but varying the concentration of the calcium hydroxide slurry and the temperature of the carbonation as indicated in the following table. In each preparation, the anionic polyelectrolyte was hexamethylenediaminetetra (methylene phosphonic acid) potassium salt added prior to the carbonation in the amount of 0.05 weight percent of the calcium carbonate equivalent of the lime content of the starting slurry.

| Ex. | Ca(OH)$_2$ g/100g slurry | Carbonation Temperature, °C. Starting | Final | Product Calcite Average Particle Size, micron |
| --- | --- | --- | --- | --- |
| 7-A | 9.5 | 4 | 11 | 0.43 |
| 7-B | 9.5 | 7 | 15 | 0.35 |
| 7-C | 9.5 | 9 | 30 | 0.023 |
| 7-D | 9.5 | 10 | 10 | 0.033 |
| 7-E | 9.5 | 15 | 16 | 0.023 |
| 7-F | 9.5 | 18 | 18 | 0.035 |
| 7-G | 9.5 | 19 | 19 | 0.028 |
| 7-H | 9.5 | 19 | 20 | 0.18 |
| 7-I | 9.5 | 20 | 20 | 0.068 |

| Ex. | Ca(OH)$_2$ g/100g slurry | Carbonation Temperature, °C. Starting | Final | Product Calcite Average Particle Size, micron |
|---|---|---|---|---|
| 7-J | 15.4 | 25 | 25 | 0.060 |
| 7-K | 15.4 | 35 | 56 | 0.2 × 0.5 (aragonite) |

As can be seen from the above preparations, the starting temperature of the carbonation must be carefully controlled at greater than about 7° C. and less than about 18° C. in order to assure consistent production of the precipitated calcite of the desired particle size of about 0.01 to 0.03 micron.

EXAMPLE 8

Precipitated calcium carbonate was prepared by following the slaking, carbonation and isolation procedures of Example 3 but at more dilute slurry concentrations using the same slurry volume as indicated in the following table. In addition, carbonations represented by Examples 8-D, 8-E and 8-F were conducted at these lower slurry concentrations in the absence of the anionic polyelectrolyte.

| Ex. | Ca(OH)$_2$ g/100g slurry | Carbonation Rate, liters/minute | Time, minutes | Product Calcite Average Particle Size, micron |
|---|---|---|---|---|
| 8-A | 7.1 | 5.7 | 47 | 0.031 |
| 8-B | 4.7 | 7.6 | 26 | 0.030 |
| 8-C | 2.3 | 7.6 | 12 | 0.022 |
| 8-D | 9.5 | 7.6 | 49 | 0.038 |
| 8-E | 7.1 | 7.6 | 39 | 0.047 |
| 8-F | 4.7 | 14.3 | 17 | 0.026 |

These carbonations demonstrate the advantage of the presence of the anionic organopolyphosphonate polyelectrolyte during carbonation of lime slurries in which the calcium hydroxide concentration is greater than about 5 weight percent.

COMPARATIVE EXAMPLE

Precipitated calcium carbonate was prepared following the slaking, carbonation and isolation procedures of Example 3, but using prior art agents, rather than the agent of the instant invention, for controlling the particle size of the product, as indicated in the following table. In these preparations, either a 13.7 or 14.3 weight percent calcium hydroxide slurry was carbonated, the agent was added prior to the carbonation in the amount indicated in the table, the carbonation was conducted using a 25 volume percent carbon dioxide in air mixture, and the temperature of the slurry was maintained at 15°±1° C. throughout the carbonation.

| Agent | g/100g CaCO$_3$ | Product Calcite Average Particle Size, micron |
|---|---|---|
| none | none | 0.5 |
| sodium hexametaphosphate | 1.0 | 0.05 |
| dimethyl acid pyrophosphate | 0.5 | 0.4 |
| phenylphosphinic acid | 0.5 | 0.4 |
| phenylphosphonic acid | 0.5 | 0.5 |
| tetrasodium pyrophosphate | 0.5 | 0.08 |
| sodium tripolyphosphate | 0.5 | 0.08 |
| sodium aluminate | 0.5 | 0.08 |
| citric acid | 0.39 | 0.06 |
| maleic acid | 1.0 | 0.06 |
| malic acid | 1.0 | 0.04 |
| phthalic acid | 1.0 | 0.05 |
| tartaric acid | 0.05 | 0.3 |
| lactic acid | 1.0 | 0.3 |
| malonic acid | 1.0 | 0.5 |
| taurine | 1.0 | 0.4 |
| glycerine | 1.0 | 0.3 |
| ethylene diamine tetra acetate, disodium salt | 1.0 | 0.04 |
| glycerophosphoric acid | 1.0 | 0.05 |
| polyacrylic acid | 0.5 | 0.05 |
| polyvinyl alcohol | 0.5 | .08 × .25 |
| sodium polyacrylate | 0.5 | 0.06 |

As can be seen from these results, precipitation in the presence of the above prior art agents results in a calcium carbonate of larger particle size, even at much higher concentration of the agents, than precipitation in the presence of the anionic organopolyphosphonate polyelectrolyte of the present invention.

I claim:

1. A process for the preparation of finely divided precipitated calcite having an average particle size not greater than about 0.03 micron, which comprises introducing carbon dioxide into an aqueous slurry of calcium hydroxide containing anionic organopolyphosphonate polyelectrolyte present in the amount of from about 0.02 to 1.0 weight percent based on the calcium carbonate equivalent of said hydroxide, the concentration of said hydroxide in said slurry being greater than about 5 weight percent, starting said introduction at a temperature above about 7° C. and below about 18° C. and continuing said introduction until calcite precipitation is substantially complete.

2. The process of claim 1 wherein said polyelectrolyte is hexamethylenediaminetetra (methylene phosphonic acid).

3. The process of claim 1 wherein said polyelectrolyte is present in said slurry in the amount of from about 0.05 to 0.5 weight percent based on the calcium carbonate equivalent of said hydroxide.

4. The process of claim 1 wherein said starting temperature is from about 10° to 15° C.

5. The process of claim 1 wherein said temperature is maintained below about 30° C. during the course of said introduction.

6. The process of claim 1 wherein the concentration of said hydroxide in said slurry is from about 10 to 15 weight percent.

7. The process of claim 1 wherein said introduction is terminated when said carbonated slurry is at a pH of about 7.

8. The process of claim 7 wherein said carbonated slurry is treated with sufficient polybasic acid to essentially neutralize any unreacted calcium hydroxide in said carbonated slurry.

* * * * *